March 11, 1924.
N. D. MUNN
CARRIER FOR MIRRORS AND THE LIKE
Filed Dec. 16, 1922
1,486,534
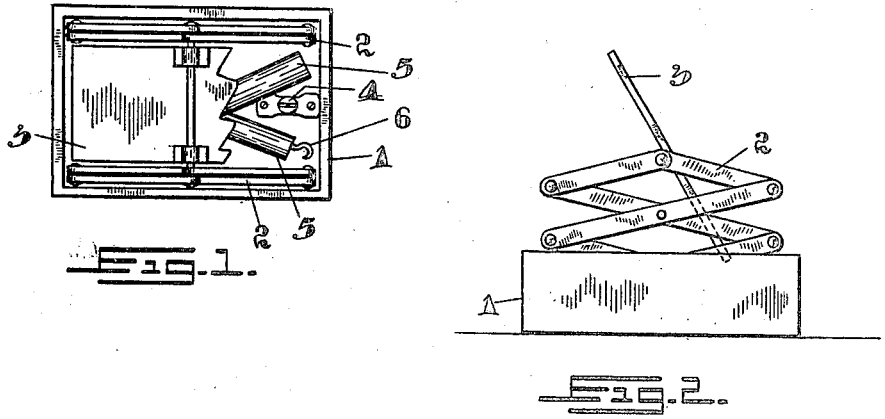
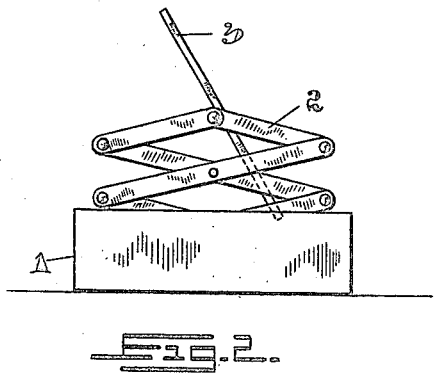
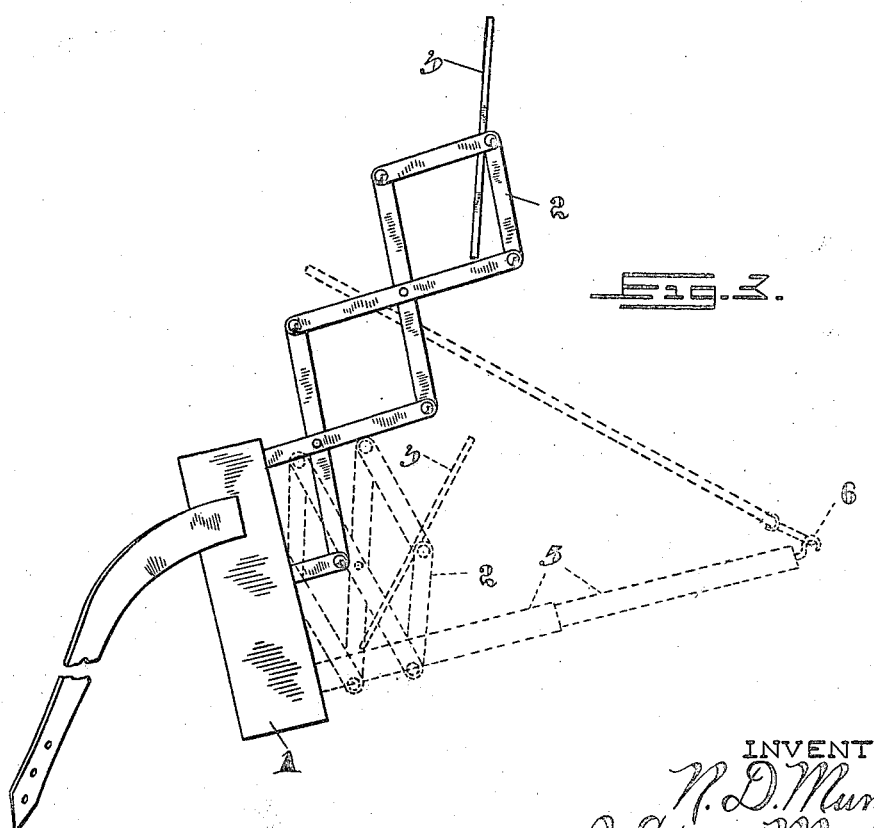
INVENTOR.
N. D. Munn.
BY J. Edward Maybee
ATTY.

Patented Mar. 11, 1924.

1,486,534

UNITED STATES PATENT OFFICE.

NEIL D. MUNN, OF DRESDEN, ONTARIO, CANADA.

CARRIER FOR MIRRORS AND THE LIKE.

Application filed December 16, 1922. Serial No. 607,432.

*To all whom it may concern:*

Be it known that I, NEIL D. MUNN, of Dresden, in the county of Kent, in the Province of Ontario, Canada, a subject of the King of Great Britain, have invented certain new and useful Improvements in Carriers for Mirrors and the like, of which the following is a specification.

In traveling it is usual for both ladies and gentlemen to carry a hand mirror. These hand mirrors have the disadvantage that one hand is always occupied in holding the mirror, leaving only one hand free for use. They further have the disadvantage that when it is necessary to use both hands, the mirror has to be set down, and it is often the case that proper light cannot be obtained where the mirror has to be placed.

My object, therefore, is to devise a mirror carrier which may be either used as a small stand mirror or which may be secured on the person in such a way that both hands will be free to do the desired task. The advantage of being able to support a mirror is particularly of advantage, for example, to a gentleman while shaving or to a lady while arranging her hair, as the person may stand in the most suitable position to secure the best light. I also aim to arrange my carrier in such a way that it will take up very little, if any, more room than the ordinary hand mirror.

I attain my object by means of the constructions hereinafter described and illustrated in the accompanying drawings in which—

Fig. 1 is a plan view of my device folded in its casing;

Fig. 2 a side elevation showing the device partly extended as used for a stand mirror; and Fig. 3 a side elevation showing the device fully extended as used when shaving; and showing the strop support in position for use in dotted lines.

In the drawings like numerals of reference indicate corresponding parts in the different figures.

1 is a base, which is preferably formed as a rectangular casing adapted to hold the various parts. To each side of this casing is pivotally connected one end of a set of lazy tongs 2. Between the other ends of the lazy tongs is pivotally supported a mirror 3. The pivotal connections between the lazy tongs and the casing and between the lazy tongs and the mirror are friction tight so that the parts tend to remain in position as adjusted.

Within the casing is secured a post support 4 having a divided upper end over which may be frictionally engaged the lower end of a tubular stropping post. This stropping post is preferably formed of two or more parts 5, preferably of seamless tubing, which may be secured together end for end in any suitable manner, such, for example, as by screw joints, although any other joint would answer equally as well. The upper part 5 is provided with a hook 6 to which one end of a razor strop may be secured.

The device is used as follows: When travelling or when not in use the parts will occupy the position shown in Fig. 1. When it is desired to use the mirror as a stand mirror, the lazy tongs will be partially extended as shown in Fig. 2 and the mirror swung on its pivot to any suitable angle.

When it is desired to use the mirror for shaving, the casing will be secured to the person by means of a strap, passing around the user's waist, and the lazy tongs fully extended as shown in Fig. 3. The lazy tongs and mirror may be adjusted to any desired angle.

When it is desired to use the stropping post, the lazy tongs will be retracted at least sufficiently to provide room for the strop. As the stropping post is formed of a plurality of detachable parts, it may be received in the casing 1 when not in use.

From the above description it will be seen that I have devised a construction which will satisfactorily attain the objects of my invention as set out in the preamble of this specification.

What I claim is:

1. In a support for mirrors and the like, the combination of a casing; an extensible member connected at one end to said casing; a mirror supported adjacent the other end of the member, said member, when retracted, adapted to be received with said mirror in the casing; and a post detachably supported on said base, said post being formed of a plurality of detachable sections adapted to be received in the casing.

2. In a support for mirrors and the like, the combination of a base; a securing strap for said base; a member secured to the base; a mirror carried by said member; a post support secured to the base and a post detachably mounted on said post support, said post being formed of a plurality of detachable sections adapted to be received in the casing.

3. In a support for mirrors and the like, the combination of a casing; an extensible member connected at one end to said casing; a mirror supported adjacent the other end of the member, said member, when retracted, adapted to be received with said mirror in the casing; a post support secured to said casing; a post detachably supported on said post support, said post being formed of a plurality of detachable sections adapted to be received in the casing.

4. In a support for mirrors and the like, the combination of a casing; an extensible member connected at one end to said casing; a mirror supported adjacent the other end of the member, said member, when retracted, adapted to be received with said mirror in the casing; a post support secured to said casing having a split upper end; and a tubular post adapted to be frictionally engaged over the split end of said post support.

5. In a support for mirrors and the like, the combination of a casing; an extensible member connected at one end to said casing; a mirror supported adjacent the other end of the member, said member, when retracted, adapted to be received with said mirror in the casing; a post support secured to said casing having a split upper end; and a tubular post adapted to be frictionally engaged over the split end of said post support, said post being formed of a plurality of detachable sections adapted to be received in the casing.

6. In a support for mirrors and the like, the combination of a base; a securing strap for said base; a member secured to the base; a mirror carried by said member; a post support secured to the base having a split upper end; and a tubular post adapted to be frictionally engaged over the split end of said post support, said post being formed of a plurality of detachable sections adapted to be received in the casing.

Signed at Dresden, Ontario, this 2nd day of December, 1922.

NEIL D. MUNN.